(12) United States Patent
Meson

(10) Patent No.: US 7,393,003 B2
(45) Date of Patent: Jul. 1, 2008

(54) BASE PLATE ATTACHMENT

(75) Inventor: Eduardo Meson, Auburn Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 391 days.

(21) Appl. No.: 11/094,257

(22) Filed: Mar. 31, 2005

(65) Prior Publication Data

US 2006/0220351 A1  Oct. 5, 2006

(51) Int. Cl.
  *B60R 21/16* (2006.01)
(52) U.S. Cl. .................. 280/728.2; 280/728.3; 280/731
(58) Field of Classification Search ............. 280/728.2, 280/728.3, 728.1, 731
  See application file for complete search history.

(56) References Cited

U.S. PATENT DOCUMENTS

| | | | |
|---|---|---|---|
| 5,520,411 A * | 5/1996 | Lang et al. ............... | 280/728.3 |
| 5,577,768 A * | 11/1996 | Taguchi et al. ............... | 280/735 |
| 5,829,777 A | 11/1998 | Sakurai et al. | |
| 5,992,875 A | 11/1999 | Cundill | |
| 6,036,222 A | 3/2000 | Holmes et al. | |
| 6,186,535 B1 | 2/2001 | Sugiyama et al. | |
| 6,199,895 B1 | 3/2001 | Seymour | |
| 6,199,899 B1 * | 3/2001 | Krebs et al. ................. | 280/731 |
| 6,419,261 B1 | 7/2002 | Ibe | |
| 6,752,415 B2 | 6/2004 | Nelson et al. | |
| 2002/0096866 A1 | 7/2002 | Ireton | |
| 2003/0067143 A1 | 4/2003 | Nelson et al. | |
| 2004/0262889 A1 * | 12/2004 | Roychoudhury ......... | 280/728.2 |

* cited by examiner

*Primary Examiner*—Eric Culbreth
(74) *Attorney, Agent, or Firm*—Foley & Lardner LLP

(57) ABSTRACT

An airbag assembly includes an airbag, an inflator for inflating the airbag, a cover and a base plate. The base plate attaches to the cover such that the base plate is secured on each edge of the base plate and is prevented from detaching. The base plate and cover do not require fasteners or removable pieces. The base plate comprises a bendable tab. The bendable tab is configured to bend over an edge of the cover and secure to the cover by a lip on an end of the bendable tab.

9 Claims, 5 Drawing Sheets

BASE PLATE ATTACHMENT

BACKGROUND

The present invention relates generally to the field of airbag modules and base plate attachments.

A conventional module for housing an airbag module in a vehicle has a cover or deployment door which attaches to a housing or base plate in which an air bag and inflator are housed. Commonly, a plurality of threaded studs extend from the base plate about its mouth and the cover has corresponding complementary holes which mate with the studs.

Conventional attachment designs may include rivets, rings, or rigid hooks to connect the base plate and cover. Other conventional airbag systems require the use of two separate base plates, which increase the costs associated with manufacturing the airbag system.

One drawback of such conventional designs is that the requirement of extra fasteners, rigid hooks or additional base plates increases the overall weight of the airbag module, cost and the difficulty in assembling the module.

Another drawback of using threaded studs to retain a cover to a base plate is that the studs can be inadvertently cross-threaded during assembly. The studs often require checking in order to verify proper assembly. Furthermore, the deployment of an airbag can be modified when the cover separates from the base plate during deployment, which varies the restraint performance from a designed and expected performance.

Additional drawbacks exist when utilizing fasteners to secure an air bag cover. For example, threaded fasteners are susceptible of loosening from vibration as a vehicle travels over a bumpy road and therefore require use of a thread binding agent or a lock washer to prevent loosening. This further increases the number of parts, complicates the assembly, and adds to cost and time required for assembly. As a result, such systems for attaching a cover to a base plate tend to be less feasible when constructing air bag modules for use in high volume and low cost applications.

SUMMARY

One embodiment of the invention relates to an airbag assembly. The airbag assembly comprises a base with a main plate portion and a bendable tab, a cover attachable to the base, an airbag stored between the cover and the base, and an inflator configured to inflate the airbag. The bendable tab is configured to attach to the cover.

According to another embodiment of the invention, a base for an airbag module is provided. The base includes a bendable tab that is configured to attach to a cover for an airbag.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Hereinafter, embodiments of the present invention will be described with reference to the attached drawings.

Figure 1:
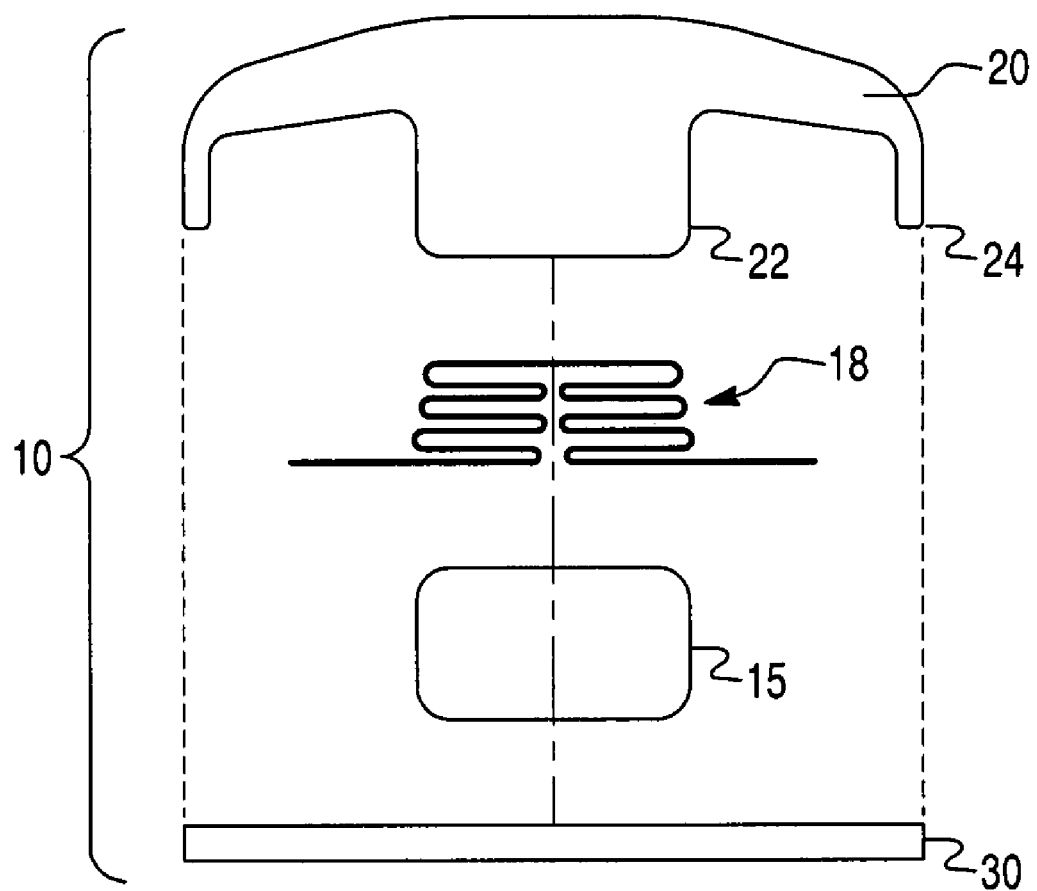
FIG. 1 is an exploded side view of an airbag module.

FIG. 1 discloses an airbag module 10 for housing an airbag according to one embodiment of the present invention. The airbag module 10 comprises an airbag 18, a cover 20 and a base plate 30. The base plate 30 is configured to attach to the cover 20, when the airbag module 10 assembled. The airbag module 10 may also include an inflator 15. The inflator 15 provides the inflation gas to inflate and deploy the airbag during a collision.

Figure 2:
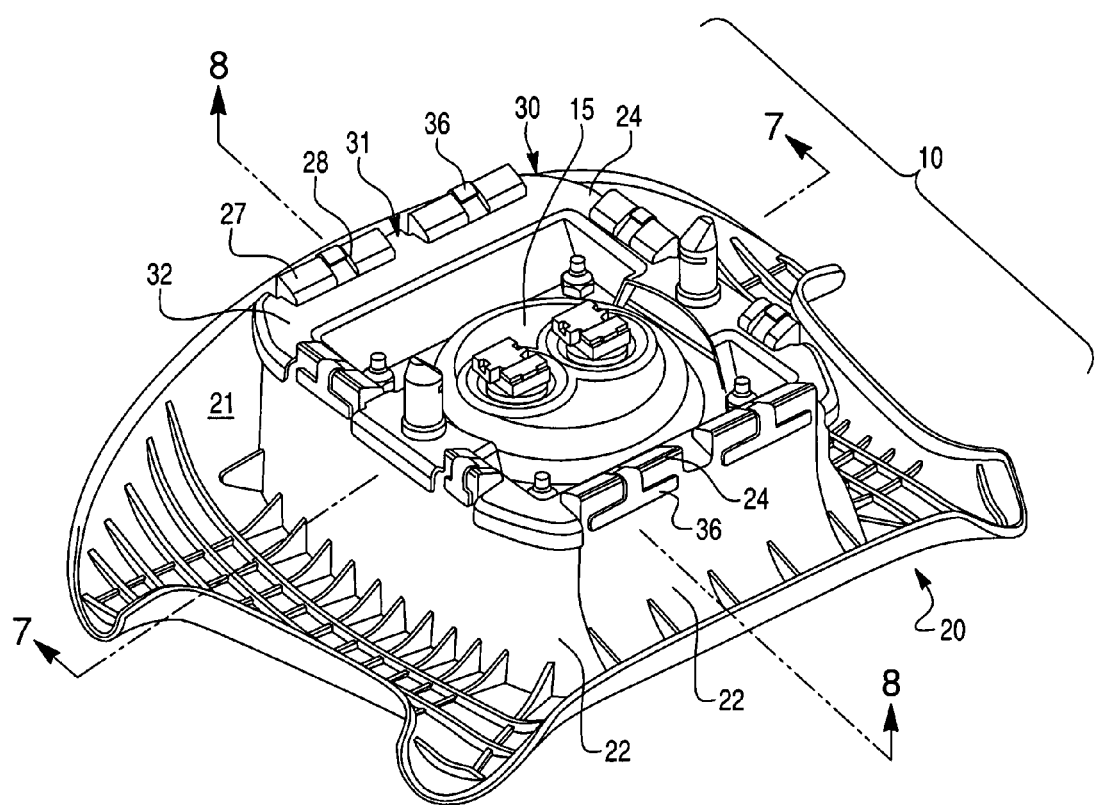
FIG. 2 is a perspective view of an airbag assembly according to an embodiment of the invention.

The inflator 15, shown in FIGS. 1 and 2, may comprise a gas generant or propellant in order to provide inflation gas to the airbag 18. In addition, the inflator 15 may include a decomposing type material as the source of the pressurized gas for the airbag 18. The inflator 15 may include an igniter or initiator assembly (not shown). The igniter receives a signal from a controller in order to initiate operation of the inflator 15 when the controller determines a collision is occurring.

The airbag 18 is folded in the airbag module 10 in the uninflated state. The airbag 18 connects to a retainer (not shown) to retain the airbag 18 to the base plate 30.

The airbag module 10, as shown in FIG. 1, may be mounted in the steering wheel of the vehicle or other suitable location. The airbag module 10 is positioned within the steering wheel of the vehicle in order to protect a driver in a collision, specifically a frontal collision. However, the airbag module 10 may be mounted along the dash, in a door, or any other suitable location for protecting a passenger or driver of a vehicle.

The cover 20 is generally formed of a plastic material, such as a soft resin, or any other suitable material. The cover 20 must be able to withstand any wear and tear derived from its position in the cabin of a vehicle and must also be able to break open upon deployment of the airbag 18.

The cover 20 is attached to the base plate 30 such that an open area is created between the cover 20 and the base plate 30. The airbag 18 is stored, in the uninflated state, in the open area between the cover 20 and the base plate 30. The cover 20 forms the barrier between the airbag 18 and the inside of the vehicle passenger cabin area. For example, the cover 20 may form the center portion of a steering wheel.

The cover 20 includes an interior surface 21 that is adjacent the stored airbag 18 and away from the vehicle passenger cabin area. The cover 20 additionally includes side walls 22 that extend up from the interior surface 21 and create the open area or space for the airbag 18 and inflator 15. The side walls 22 end at edges 25 that are generally flat.

The airbag module 10 is mounted to the vehicle by the base plate 30. The base plate 30 holds the uninflated airbag 18 cushion in the open space between the cover 20 and the base plate 30.

The base plate 30 can be made of metal. In addition, the base plate 30 should be of sufficiently high strength such that the base plate 30 can withstand the forces from a collision and from the inflation of the airbag 18.

Figure 3:
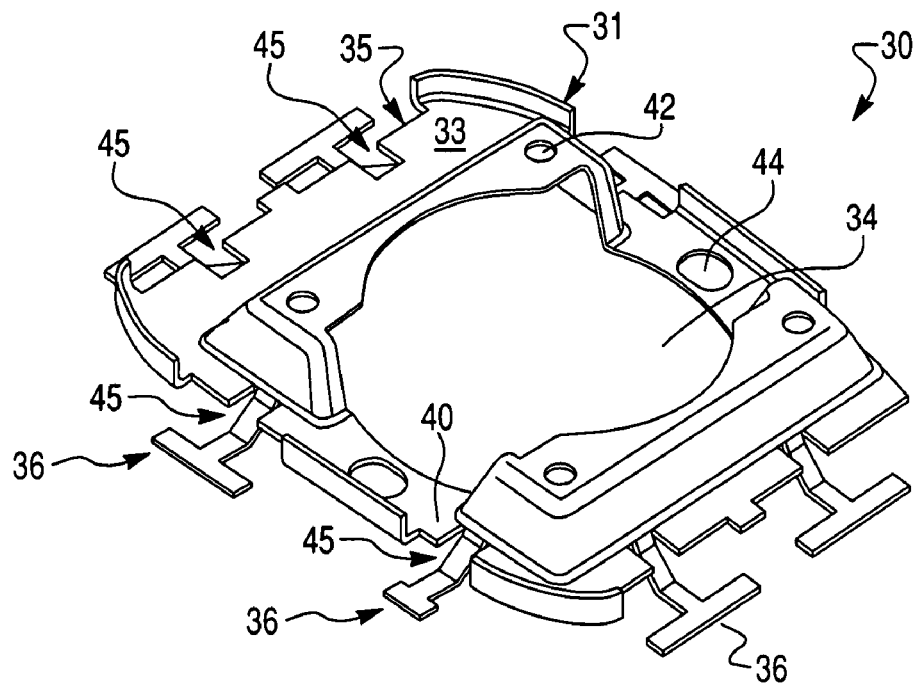
FIG. 3 is a top perspective view of a base plate.

The base plate 30 of an airbag module 10 comprises a main plate portion 31 in a generally square plate shape with edges 35 as can be seen in FIG. 3. An opening 34 is formed at the center of the main plate portion 31 for inserting an inflator 15. Further, bolt through-holes 42 can be positioned at the periphery of the opening 34 for mounting the inflator 15 and/or the air bag. Mounting holes (bolt passing holes) 44 may also be disposed in the main plate portion 31 for mounting the base plate 30 and, thus, the airbag module 10, to the vehicle.

The base plate 30 includes a plurality of tabs 36 on edges 35 of the main plate portion 31, as shown in FIG. 3. The tabs 36 are configured to be bendable. Each tab 36 includes a bendable portion 37 that folds or bends back from the surface of the main plate portion 31 at a crease portion 38, shown in FIG. 4. The tab 36 is generally planar with the main plate portion 31 of the base plate 30 when the tab 36 is in a starting, or original, position, such as shown in FIG. 3. When the tab 36 is attached to the edge 24 of the cover 20, the bendable portion 37 of the tab 36 is bent at an angle less than 90° from the main plate portion 31. This allows for the tab 36 to securely attach over the edge 24 of the cover 20. The tab 36 is bent or positioned such that it lies against the edge 24 of the cover when the base plate 30 is attached to the cover 20.

The tab 36 is configured in a "T" shape, with a "T" section 26b and two extending ends 26a that are perpendicular to the bendable portion 37. The "T" section 36b, with ends 36a, is bent 90° relative to the plane of the base plate 30. This is to ensure that the flange 27 will be positioned with the base plate 30 during deployment of the airbag 18.

Tab 36 fits into a corresponding notch 28 in flange 27. A flat surface 54 of the flange 27 is adjacent the inside surface 33 of the base plate 30. The tabs 26 bend around the top of the flange 27 and press against the top area 56 of the flange 27. The ends 36a of the tab 36 press against the upward extending portion 29 of the flange 27.

In the embodiment shown in FIG. 2, the base plate 30 includes a plurality of tabs 36, such that each edge 35 of the base plate 30 includes at least one tab 36. This configuration, having an attachment in every direction, can prevent the cover 20 from detaching from the base plate 30. Of course, it will be recognized that any number of tabs 36 can be used, such as one, or any other suitable amount.

Figure 4:
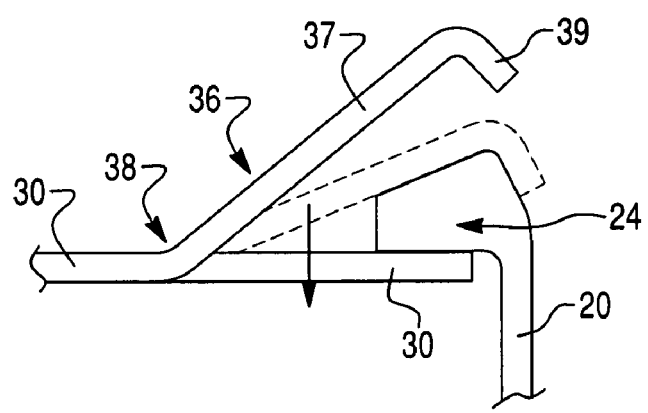
FIG. 4 is a detail view of a tab.
Figure 5:
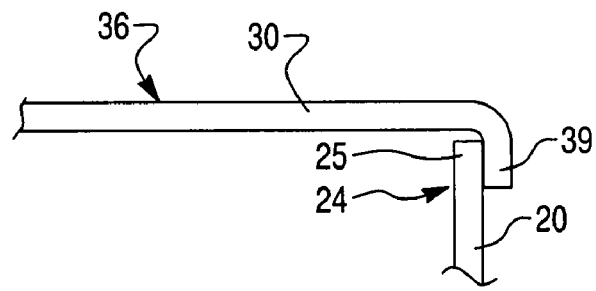
FIG. 5 is another detail view of the tab.
Figure 6:
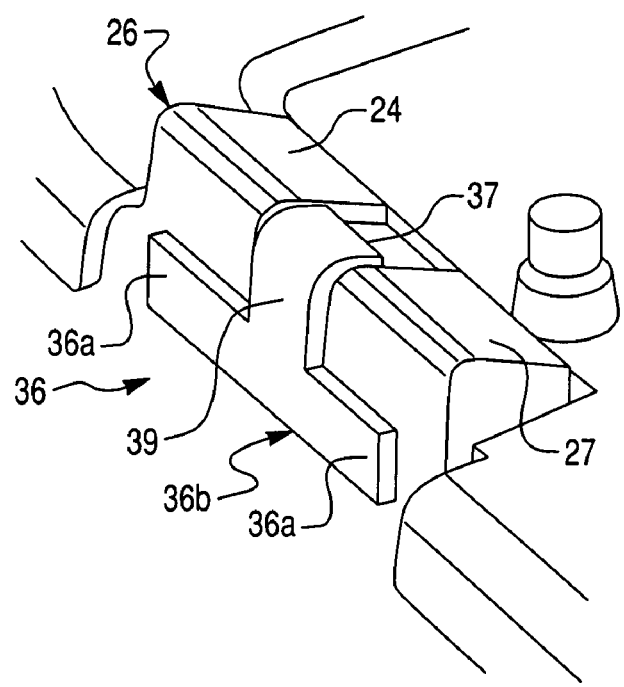
FIG. 6 is a detail perspective view of a tab on the base plate.
Figure 7:
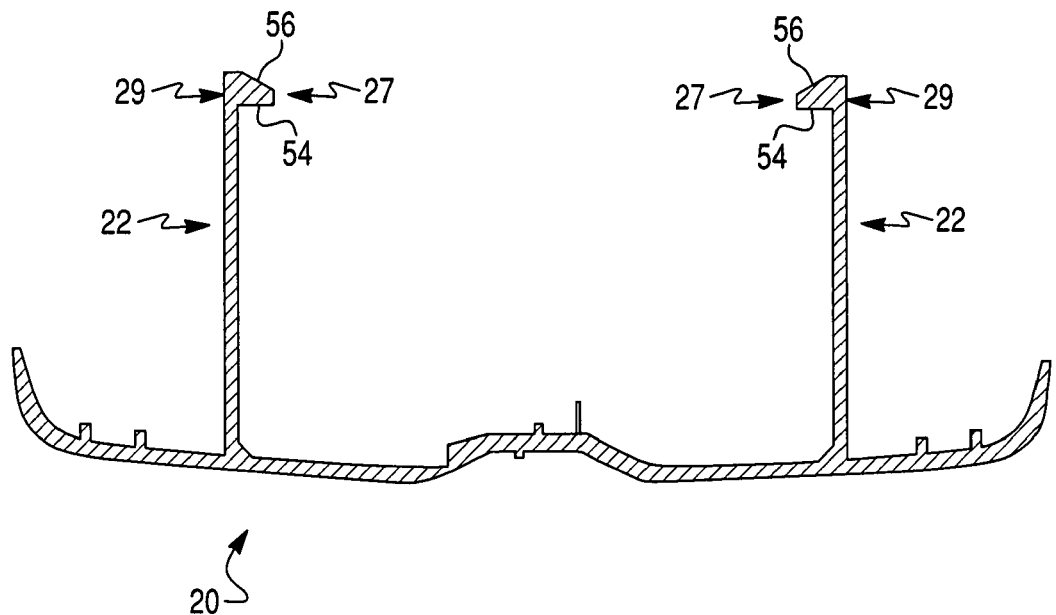
FIG. 7 is a cross-sectional view of the cover taken along line A-A of FIG. 2

A lip 39, as shown in FIGS. 4 and 5, is positioned at an end of the bendable portion 37. The lip 39 curves downward toward the cover 20 such that the lip fits over the receiving edge 24 of the cover 20. The tab 36 can also fit over a flat portion 25 of the edge 24, as can be seen in FIG. 5. The lip 39 curves downward from the bendable portion 37 at an angle of approximately 90°.

When the base plate 30 and cover 20 are assembled, a user can lift up or bend back the bendable portion 37 of the tab 36 such that the base plate 30 can fit into position in the cover 20. The tab 36 is then released, allowing for the bendable portion 37 to return toward its original position and fit over the edge 24 of the cover 20.

The base plate 30 can further include a receiving edge portion 40 positioned along an edge 35 of the main plate portion 31. The receiving edge portion 40 is configured to receive a flange 27 from the cover 20. The receiving edge portion 40 is composed of a thickness configured to slide under the flange 27. The flange 27 slides or fits over the receiving edge portion 40, securing the cover 20 to the base plate 30. The flange 27 extends up from the edge 24 of the cover 20 by an upward extending portion 29. The edge 35 of the receiving edge portion 40 abuts the upward extending portion 29 of the cover 20.

The base plate 30, according to another embodiment, can be composed of any suitable material such as, for example, a high strength resin. Further, the base plate 30 can comprise any shape, such as oval, round, rectangular, etc. In addition, the position and number of mounting holes 44 and bolt through-holes can vary.

In another embodiment, the position and number of tabs 36 and receiving edge portions 40 may vary as suitable for the airbag module 10. According to another embodiment, the lip 39 can extend down from the bendable portion 37 of the tab 36 at any angle suitable for fitting over the edge 24 of the cover 20.

The "z" position of the module 10 is maintained for the base plate 30 by the top surface area of the cover 20. In other words, the height of the walls 22 determines and maintains the "z" position of the module 10.

Figure 8:
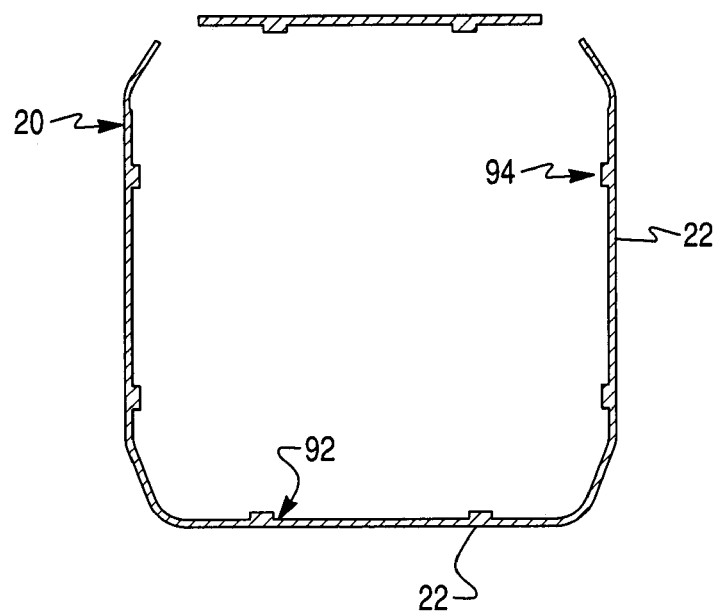
FIG. 8 is another cross-sectional view of the cover taken along line B-B of FIG. 2.

The "x" position is made by utilizing an internal horizontal rib 92 in the cover 20, as shown in FIG. 8. The horizontal rib 92 is configured to have dimensions equal to the dimensions of one of a base plate notch 45. The rib 92 fits in the notch 45 to maintain the module in the x direction.

The "y" direction is made by using a vertical internal rib 94 in the cover 20. The vertical rib 94 has dimensions equal to the dimensions of one of the corresponding base plate notches 45. The vertical rib 94 fits in the notch 45 and keeps the module 10 in the proper position by preventing any movement in the y direction.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. It will be recognized that any combination of embodiments may be utilized. The scope of the present invention is to be defined with reference to the following claims.

What is claimed is:

1. An airbag module comprising:
   a base with a main plate portion and a bendable tab;
   a cover attachable to the base plate;
   an airbag stored between the cover and the base plate; and
   an inflator configured to inflate the airbag,
   wherein the bendable tab is configured to attach to the cover and is positioned in a notch in a flange on the cover.

2. The airbag module of claim 1, wherein the bendable tab includes a bendable portion and a lip positioned at an end of the bendable portion for fitting over an edge of the cover.

3. The airbag module of claim 2, wherein the lip is at approximately a 90° angle from the bendable portion of the tab.

4. The airbag module of claim 1, wherein the bendable tab includes a crease portion at which the bendable tab is configured to bend.

5. The airbag module of claim 1, further comprising a plurality of bendable tabs positioned around each edge of the base.

6. The airbag module of claim 1, wherein the base includes a receiving edge portion configured to fit under a flange on the cover to lock the base to the cover.

7. The airbag module of claim 1, wherein the bendable tab is generally planar with the main plate portion of the base when in a starting position.

8. The airbag module of claim 1, wherein the bendable tab is at an angle less than 90° from the plane of the main plate portion of the base when the tab is attached to an edge of the cover.

9. The airbag module of claim 1, wherein the bendable tab comprises a T shape with ends extending perpendicular to a bendable portion of the tab.

* * * * *